(12) United States Patent
Wei et al.

(10) Patent No.: US 9,575,649 B2
(45) Date of Patent: Feb. 21, 2017

(54) VIRTUAL TOUCHPAD WITH TWO-MODE BUTTONS FOR REMOTE DESKTOP CLIENT

(71) Applicant: VMWare, Inc., Palo Alto, CA (US)

(72) Inventors: Yuping Wei, Beijing (CN); Yueting Zhange, Beijing (CN); Wenlong Shao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 135 days.

(21) Appl. No.: 13/870,764

(22) Filed: Apr. 25, 2013

(65) Prior Publication Data

US 2014/0320421 A1 Oct. 30, 2014

(51) Int. Cl.
 *G06F 3/0488* (2013.01)
 *G06F 3/041* (2006.01)

(52) U.S. Cl.
 CPC ........... *G06F 3/0488* (2013.01); *G06F 3/0412* (2013.01)

(58) Field of Classification Search
 CPC  G06F 3/0488; G06F 3/04883; G06F 3/04886; G06F 3/038; G06F 3/0426
 USPC .................................................. 345/173–178
 See application file for complete search history.

(56) References Cited

U.S. PATENT DOCUMENTS

| | | | |
|---|---|---|---|
| 8,754,855 B2* | 6/2014 | Duncan et al. | 345/173 |
| 2002/0075164 A1* | 6/2002 | Iizuka et al. | 340/870.16 |
| 2008/0106523 A1* | 5/2008 | Conrad | 345/173 |
| 2011/0037720 A1* | 2/2011 | Hirukawa | G06F 3/0488 345/173 |
| 2012/0054671 A1* | 3/2012 | Thompson et al. | 715/784 |
| 2013/0328779 A1* | 12/2013 | Butner et al. | 345/163 |
| 2014/0123049 A1* | 5/2014 | Buxton | G06F 3/04883 715/773 |

OTHER PUBLICATIONS

Using ClickLock, 2011, Microsoft, https://web.archive.org/web/20110530054902/http://windows.microsoft.com/en-US/windows-xp/help/using-clicklock.*
Pinto et al., US Patent Application Publicaton 2011/0246904 filed Oct. 6, 2011, Figure 15A and related text.
"Using Clicklock"; Microsoft Windows, http://windows.microsoft.com/en-us/windows-xp/help/using-clicklock, Apr. 25, 2013.

* cited by examiner

*Primary Examiner* — Chanh Nguyen
*Assistant Examiner* — Daniel Duong
(74) *Attorney, Agent, or Firm* — Patterson & Sheridan LLP (57) ABSTRACT

Left- and right-click buttons of a virtual touchpad each have two modes, a "click" mode and an "on/off" mode. In "click" mode, touching a finger to the left- or right-click button triggers a mouse button down event while releasing a finger from the button triggers a mouse button up event. In "on/off" mode, the left- and right-click buttons each have two states, "on" and "off." If the current state of the left- or right-click button is "off," then touching the button triggers the mouse button down event, while releasing the button changes the state of the button to "on" but does not trigger any mouse events. Conversely, if the current state of the left- or right-click button is "on," then touching the button does not trigger any mouse events, but releasing the button thereafter changes the state of the button to "off" and triggers the mouse button up event.

15 Claims, 6 Drawing Sheets

VIRTUAL TOUCHPAD WITH TWO-MODE BUTTONS FOR REMOTE DESKTOP CLIENT

BACKGROUND

When a user remotely accesses an application configured for mouse-and-keyboard based commands, the user controls a particular server machine remotely from his or her computing device. This type of interaction is commonly referred to as a "remote" session. Throughout a remote session, the video output data generated at the server machine is routed to the user's computing device, where such video data includes a user interface (UI) of an operating system and/or applications executing on the host machine. Conversely, user input data received at the user's computing device is routed to the server machine, where the operating system and/or applications interpret the routed input data as if the input data was received locally at the server machine.

In remote sessions, it is not uncommon for users on mobile devices to use virtual touch pads to perform mouse actions. Virtual touch pads present UIs akin to physical touch pads on laptop computers. Touch gestures (e.g., tapping or dragging a finger) performed on a virtual touch pad are translated to mouse commands and routed to the host machine as such. However, on small devices, operations which typically require two fingers to perform on the virtual touch pad may become difficult, if not impossible, to perform. For example, highlighting and drag operations are typically performed by holding down a left-click button of the virtual touch pad while simultaneously moving a finger across the virtual touch pad's touch area. Such drag operations require two fingers to perform, and become cumbersome on small mobile devices such as mobile phones.

One approach for performing highlighting and drag operations without holding down the left-click button relies on "click lock," in which the left-click button is maintained in a mouse button down state by software in response to a user's button press that lasts for at least a given time duration (e.g., 2 seconds). However, in remote sessions, there is often delay between the client device and the desktop running on the host machine, making it difficult for a user to distinguish whether the left-click button has been pressed for a particular time duration. Moreover, "tap to click," a common feature of virtual touch pads that permits a click to be performed by tapping on a pad's touch area, may break drag operations despite click lock, as the click resulting from such a tap typically ends the continuous button click provided by software.

SUMMARY

Embodiments presented herein provide techniques for performing an operation on a virtual touchpad. The techniques include changing a mode of a button of the virtual touchpad from a click mode to an on/off mode. The techniques further include, upon receiving a first tap on a displayed representation of the button when the button is in an off state, transmitting a mouse button down command to an operating system in response to a touch during the first tap, and changing a state of the button to an on state in response to a release during the first tap. The techniques also include, in response to receiving a drag on a displayed touch area of the virtual touchpad, transmitting move commands to the operating system. In addition, the techniques include, upon receiving a second tap of the displayed representation of the button, transmitting a mouse button up command to the operating system and changing the state of the button to the off state in response to a release during the second tap. Further embodiments of the present invention include a computer-readable storage medium storing instructions that when executed by a computer system cause the computer system to perform one or more the of the techniques set forth above, and a computer system programmed to carry out one or more of the techniques set forth above.

DETAILED DESCRIPTION

Embodiments presented herein permit operations such as dragging and highlighting to be performed on a virtual touchpad using only one finger. The left- and right-click buttons of the virtual touchpad may each have two modes, a "click" mode and an "on/off" mode. The virtual touchpad may further include a switch button for changing between the modes. In "click" mode, touching a finger to the left- or right-click button triggers a mouse button down event while releasing a finger from the left- or right-click button triggers a mouse button up event. In "on/off" mode, the left- and right-click buttons each have two states, "on" and "off." If the current state of the left- or right-click button is "off," then touching the button triggers the mouse button down event, while releasing the button thereafter changes the state of the button to "on" but does not trigger any mouse event. Conversely, if the current state of the left- or right-click button is "on," then touching the button does not trigger any mouse events, but releasing the button thereafter changes the state of the button to "off" and triggers the mouse button up event. In one embodiment, the mode and the state of the left- and/or right-click buttons may be indicated to the user via a user interface (UI). In a further embodiment, tap-to-click may be disabled on the touch area of the virtual touchpad where the left- and right-click buttons are in the "on/off" mode and either of those buttons is touched while in the "off" state.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1A:
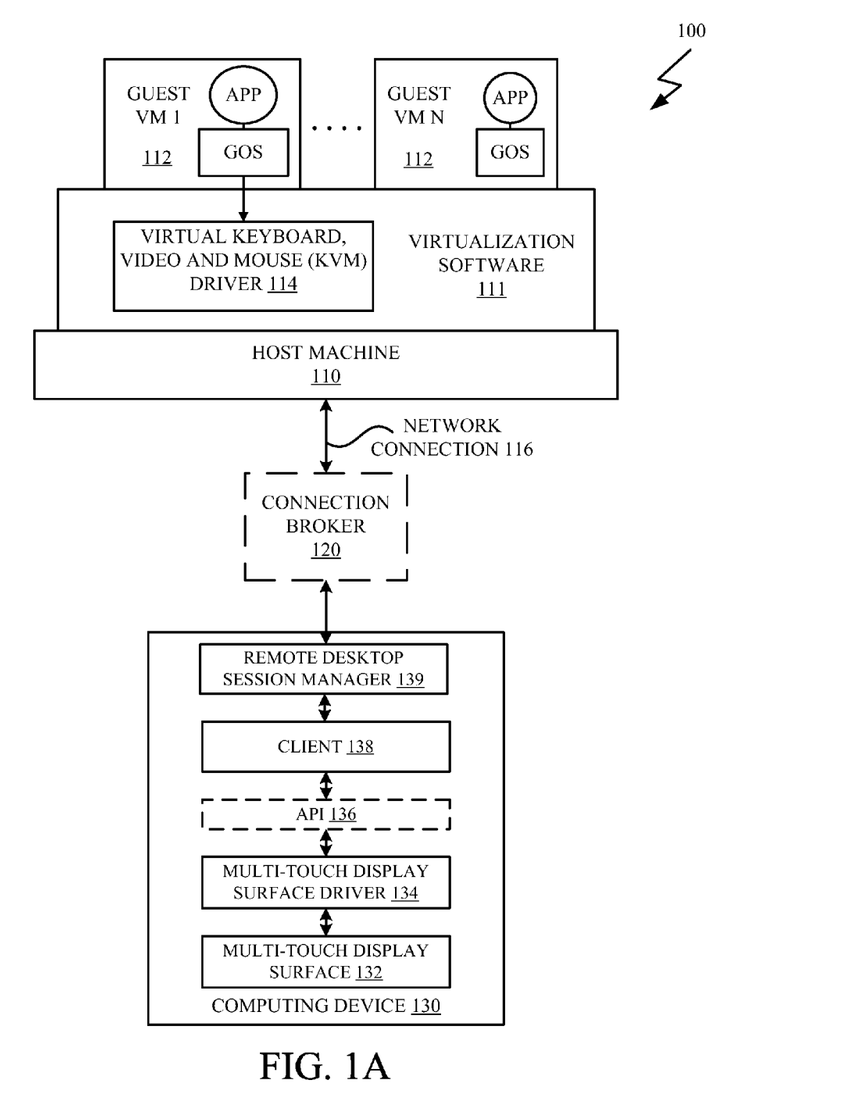
FIG. 1A is a conceptual diagram of a remote session that shows by way of example a computing device connected through a network to a host machine, according to an embodiment of the invention.

FIG. 1A is a conceptual diagram 100 of a remote session that shows by way of example a host machine 110 connected through a network 120 to a computing device 130. The host machine 110 may comprise a general purpose computer system having one or more applications, virtual machines, or other entities. While the description below shows by way of example a remote access of a virtual machine running on a remote host using a client device having a touch interface, it should be recognized that the present invention may be used in any UI remoting application, including, for example, terminal services providing remote access to individual desktop applications, remote control applications where a user may want to remotely access their home or work physical computer system, desktop support applications in which a user allows an administrator to remotely access their desktop PC, etc.

In one embodiment, the host machine 110 comprises a virtualized computer system wherein each guest VM 112 is a virtual machine (VM) implemented by virtualization software 111, or a component thereof. Virtualization configurations are well known in the field of computer virtualization. A virtual keyboard, video, and mouse (KVM) driver 114, implements, for a particular one of guest VMs 112, virtual user interface devices and communicates user inputs and system outputs (such as display and audio information) to remote computing device 130.

Each guest VM may include a guest operating system (GOS) and one or more applications (APP). The guest operating system may be a commodity operating system such as Microsoft Windows® or a specialized operating system designed specifically to work with virtualization software 111 (sometimes referred to as a "paravirtualized OS"). In one embodiment, virtualization software 111 is stored on a physical data storage medium (not shown) forming part of host machine 110, whereas virtual disks (not shown) for each guest virtual machine are mapped by virtualization software 111 to files that may be stored remotely or locally.

Computing device 130 communicates with host machine 110 using the network 120 such that IO data may be communicated between computing device 130 and host machine 110. An optional connection broker 120 may be disposed between computing device 130 and host machine 110 to, for example, facilitate enhanced authentication and security features and/or provide simplified or customized connectivity options.

Computing device 130 may execute a client 138 that is configured to facilitate a remote session with one of guest VMs 112. Computing device 130, which may not have a mouse or keyboard attached, is configured to provide mouse-and-keyboard based commands to an application designed to accept such commands. The application may execute remotely as shown in FIG. 1A, or it may execute locally on computing device 130, e.g., a guest operating system executing in a virtual machine, as described in detail below in conjunction with FIG. 2A.

Multi-touch display surface driver 134 manages multi-touch display surface 132 included in computing device 130 and provides user input information to applications executing on computing device 130. API 136 exposes a set of functions that assist client 138 in processing user input received via multi-touch display surface 132. For example, client 138 may be notified via API 136 of a particular gesture-based user input occurring when a user places one of his or her fingers into contact with multi-touch display surface 132. Alternatively, client 138 may circumvent API 136 and instead continually monitor activity of multi-touch display surface driver 134 to process user input made to multi-touch display surface 132. Client 138 is in communication with remote desktop session manager 139, which manages the remote session between computing device 130 and a guest VM 112 executing on host machine 110.

In a remote session, remote desktop session manager 139 receives video output data generated by the guest operating system of guest VM 112 and transmits the video output data to client 138. In turn, client 138 issues instructions to multi-touch display surface driver 134 to display the video output data and any video overlays that are generated by client 138, as described in further detail below. Input data is collected and processed at computing device 130 via multi-touch display surface 132, multi-touch display surface driver 134, and/or API 136, whereupon the input data is translated into mouse and/or keyboard commands by client 138 and transmitted to host machine 110 via remote desktop session manager 139. Upon receipt, virtualization software 111 passes the user inputs to virtual keyboard, video, and mouse driver 114, which injects the user inputs into the corresponding guest VM 112 using appropriate device drivers that are installed into the guest operating system. Display updates from guest VM 112 are received by virtual keyboard, video and mouse driver 114 and translated into an appropriate desktop remoting protocol and sent to computing device 130 to update the display thereon.

Figure 1B:
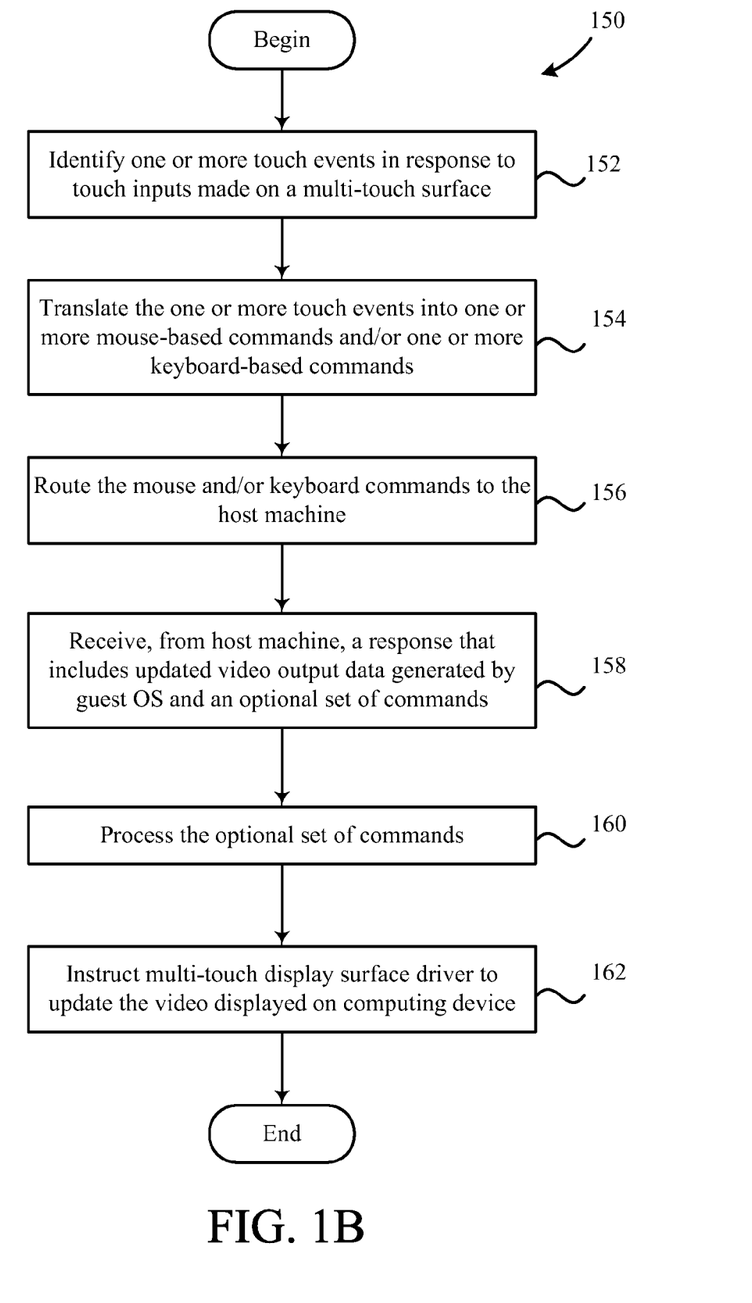
FIG. 1B is a flow diagram of method steps carried out by the computing device of FIG. 1A for translating multi-touch events into mouse and/or keyboard commands, according to an embodiment of the invention.

FIG. 1B is a flow diagram of an exemplary method 150 for transmitting and receiving remoting data between a multi-touch based remote machine and a mouse-and-keyboard based host machine, according an embodiment.

The method 150 begins at step 152, where client 138 identifies one or more touch events in response to touch inputs made on multi-touch display surface 132. At step 154, client 138 translates the one or more touch events into one or more mouse-based commands and/or one or more keyboard-based commands. In one embodiment, client 138 maintains a database in computing device 130 that associates one or more predefined touch events with a corresponding mouse-based command and/or keyboard based command. For example, a touch event that implies a mouse left-click may be associated with a mouse left-click command.

At step 156, client 138 routes the mouse and/or keyboard commands to the host machine 110. As described herein, client 138 communicates with host machine 110 using network 116, and may route such mouse and/or keyboard commands by including each in network packets that are addressed to host machine 110. At host machine 110, virtual keyboard and mouse driver 114 may inject the mouse and/or keyboard commands into the guest OS running in host machine 110. Alternatively, an application installed in the guest OS itself may inject the mouse and/or keyboard commands into the guest OS.

At step 158, client 138 receives, from host machine 110, a response that includes updated video output data and an optional set of commands. The video output data update is generated by the guest OS running in host machine 110 and detected by the video and mouse driver 114 (or, alternatively, an application within guest OS itself). Video and mouse driver 114 then transmits the video output update to client 138 in the response, which may also include the optional set of commands.

At step 160, client 138 processes the optional set of commands. In one embodiment, the optional set of commands cause client 138 to perform specific tasks. For example, if the user selects a text input field located in a window UI included in, e.g., UI 301 described below in conjunction with FIG. 3, host machine 110 may include this information in the optional set of commands. Upon receipt of such an optional set of commands, client 138 may automatically initialize and display a virtual keyboard so that the user could easily provide textual input to the text input field. As another example, client 138 may display a virtual touchpad in response to an optional set of commands.

At step 162, client 138 instructs multi-touch display surface driver 134 to update the video displayed on computing device 130. In the examples described above in step 160, client 138 may instruct multi-touch display surface driver 134 to overlay the virtual keyboard and the virtual touchpad onto a most up-to-date UI 301. Of course, in alternative embodiments, the virtual keyboard and virtual touchpad may simply be included in the UI 301 itself received from host machine 110.

Figure 2A:
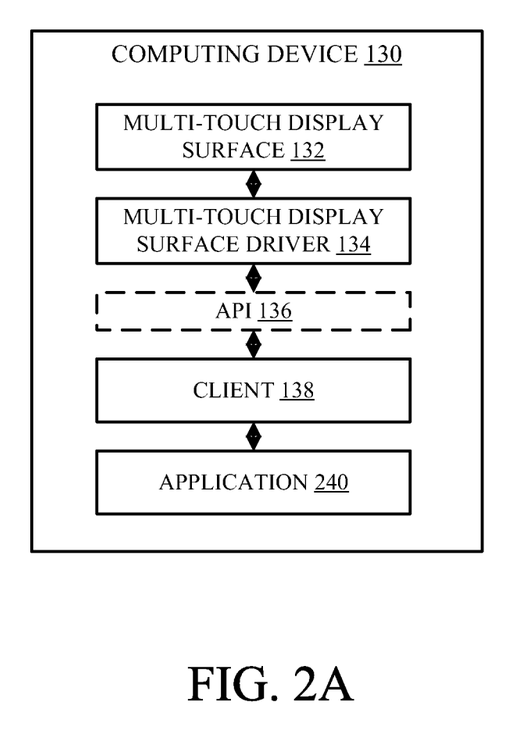
FIG. 2A is a conceptual diagram showing components of a computing device that are used in translating multi-touch interface gestures to keyboard and/or mouse commands, according to an embodiment of the invention.

FIG. 2A is a conceptual diagram of a mouse and keyboard-based application under control of computing device 130. In this embodiment, mouse-and-keyboard based application 240, which may include a virtual machine hosting a commodity operating system, is running locally on computing device 130, and is in communication with client 138. As described above, client 138 interacts with API 136 and/or multi-touch display surface driver 134 to manage user input received via multi-touch display surface 132 included in computing device 130. The user input data collected by multi-touch display surface driver 134 and/or API 136 is processed and translated by client 138 into mouse and keyboard commands that are transmitted to application 240 to emulate user input that is normally made to application 240 via a physical mouse and/or keyboard. In turn, application 240 transmits an updated user interface to client 138, which issues instructions to multi-touch display surface driver 134 to display the updated interface and any video overlays generated by client 138.

Figure 2B:
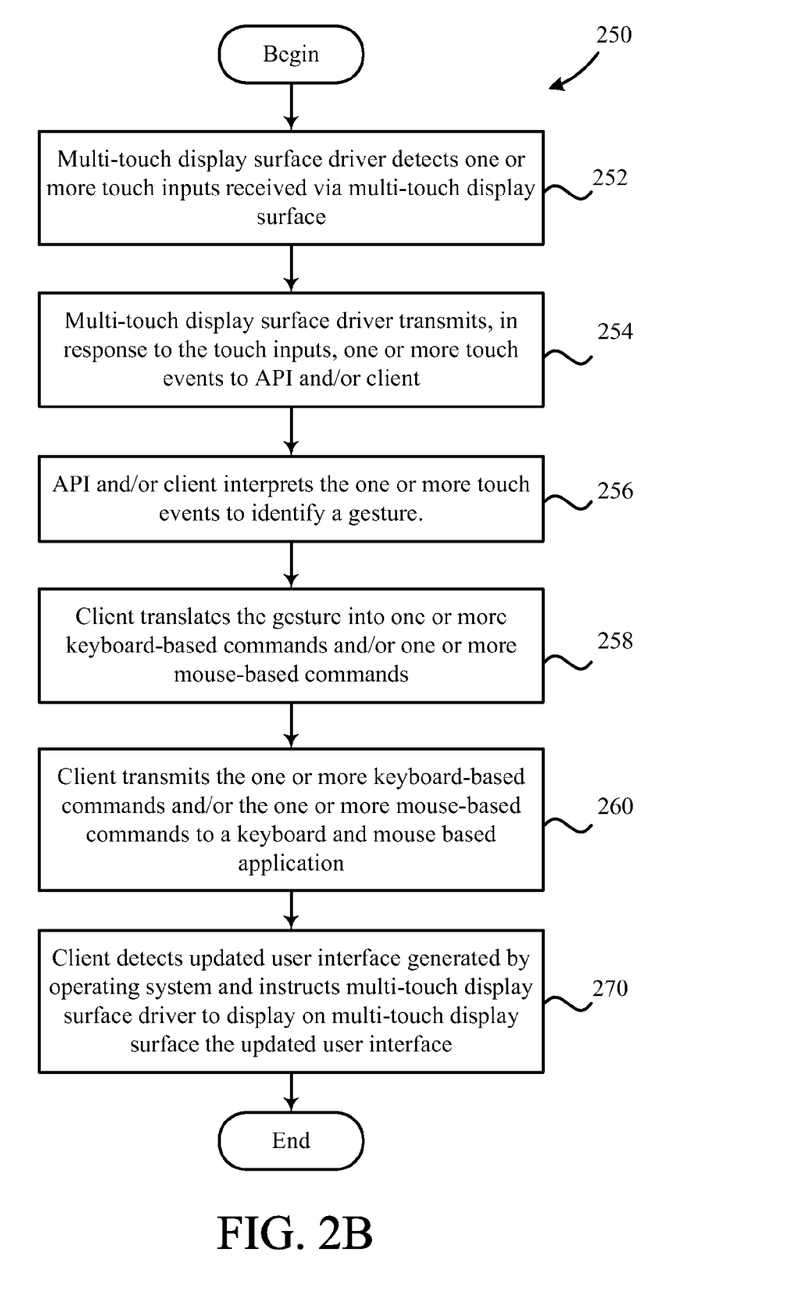
FIG. 2B is a flow diagram of method steps carried out by the computing device of FIG. 2A for translating multi-touch events into mouse and/or keyboard commands, according to an embodiment of the invention.

FIG. 2B is a flow diagram of method steps 250 for translating multi-touch events into mouse and/or keyboard commands, according to an embodiment. As shown, method 250 begins at step 252, where multi-touch display surface driver 134 detects one or more touch inputs received via multi-touch display surface 132. At step 254, multi-touch display surface driver 134 transmits, in response to the touch inputs, one or more touch events to listening applications, e.g., API 136 and client 138.

At step 256, API 136 and/or client 138 interprets the one or more touch events to identify a gesture. As described herein, client 138 may work alone or in conjunction with API 136 to process user input made to multi-touch display surface 132. At step 258, client 138 translates the gesture into one or more keyboard-based commands and/or one or more mouse-based commands, as described herein.

At step 260, client 138 transmits the one or more keyboard-based commands and/or the one or more mouse-based commands to a keyboard and mouse based application, such as an operating system executing on host machine 110. Such keyboard-based or mouse-based commands may cause the operating system to, e.g., update a user interface. At step 262, client 138 detects an updated user interface generated by the operating system and instructs multi-touch display surface driver 134 to display on multi-touch display surface 132 the updated user interface.

For purposes of illustration, the system of FIG. 1A in which computing device 130 has established a remote session with a guest VM 112 executing within host machine 110 is employed in the examples of FIGS. 3-4, below. However, it should be recognized that the system of FIG. 2A may also be employed.

Figure 3:
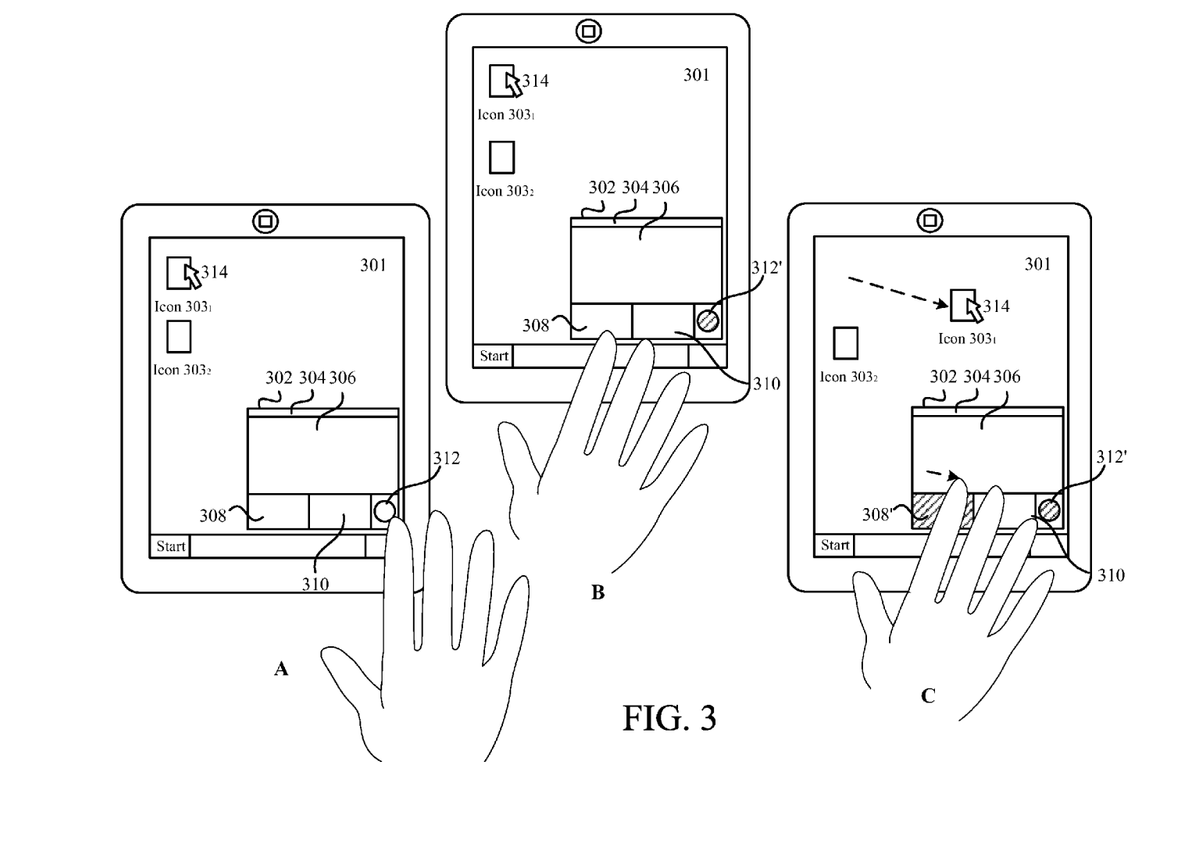
FIG. 3 is a conceptual diagram that shows a drag operation being performed using a virtual touch pad having two-mode buttons, according to an embodiment of the invention.

FIG. 3 is a conceptual diagram that shows a drag operation being performed using a virtual touch pad having two-mode buttons, according to an embodiment. As shown in panel A, client 138 overlays a virtual touch pad 302 onto UI 301, where virtual touch pad 302 comprises a move handle 304, a touch area 306, a mouse left-click button 308, a mouse right-click button 310, and a switch button 312. In one embodiment, virtual touch pad 302 may be configured to be semi-transparent so that any portion of UI 301 that lies beneath virtual touch pad 302 is not obstructed to the user. Handle 304 enables the user to adjust the location of virtual touch pad 302 within multi-touch display surface 132. For example, the user may establish "press-and-hold" within the boundaries of handle 304 and, while maintaining contact with multi-touch display surface 132, drag his or her finger to relocate handle 304. As used herein, "press-and-hold" refers to a gesture which client 138 recognizes when the user presses his or her finger to multi-touch display surface 132 for longer than a threshold time, e.g., 1 second.

Touch area 306 may be used to control the location of cursor 314 within UI 301. For example, if the user establishes press-and-hold 402 within the boundaries of touch area 306 and, while maintaining contact with multi-touch display surface 132, drags his or her finger from left-to-right across touch area 306, cursor 314 is relocated in a similar fashion. To enhance the operability of virtual touch pad 302, acceleration of movement across touch area 306 may be considered by client 138. More specifically, the user may increase the rate of movement of cursor 314 by, for example, flicking his or her finger across touch area 306. In addition, touch area 306 may be configured to recognize taps 330 on touch area 306 as mouse left-clicks, i.e., to support "tap-to-click." Here, a "tap" may comprise establishing contact between a finger and multi-touch display surface 132, then eliminating the contact (e.g., within some predetermined threshold of time, e.g., 0.15 seconds).

Illustratively, panel A depicts a user's tap on switch button 312 when left-click button 308 and right-click button 310 are in "click" mode. Switch button 312 may be used to change a mode of left-click button 308 and right-click button 310 from "click" mode to "on/off" mode, and vice versa, depending on the current mode of those buttons. If the left-click button 308 and the right-click button 310 are currently in "click" mode, then a user may tap switch button 312 to change the mode of those buttons to "on/off" mode. Conversely, if the buttons are currently in "on/off" mode, the user may tap switch button 312 to change the mode of those buttons to "click" mode. Here, client 138 may maintain the mode of the buttons by setting the value of a flag, and change the value of the flag upon the user's tap on switch button 312. In an alternative embodiment, only one of the left-click button 308 and the right-click button 310 may be changed in response to a user's tap on switch button 312.

In "click" mode, mouse left-click button 308 and mouse right-click button 310 may be used to perform traditional mouse left-clicks and mouse right-clicks, respectively. For example, to perform a mouse left-click, the user may establish tap within the boundaries of mouse left-click button 308. Similarly, to perform a mouse right click, the user may establish tap within the boundaries of mouse right-click button 310. Each tap may trigger both a mouse button down event and a mouse button up event, corresponding to the touch of the button by the user's finger and the release of the same button, respectively. That is, client 138 may transmit both a mouse button down command and a mouse button up command to host machine 110 in response to the user's touch and release of the button, respectively. In one embodiment, mouse left-click button 308 and mouse right-click button 310 may be reversed to provide operability to left-handed mouse users.

In "on/off" mode, client 138 is configured to transmit either a mouse button down or a mouse button up command to host machine 110 in response to a user's touch and subsequent release on left-click button 308 or right-click button 310 (e.g., the user's tap on left-click button 308 or right-click button 310), depending on the state of the button. More specifically, if mouse left-click button 308 (or mouse right-click button 310) is currently in the "off" state, then a user's touch on that button may trigger a mouse button down event. The subsequent release of the user's finger from the button does not trigger any mouse events, but changes the current state of the button to an "on" state. In one embodiment, the user's touch on the button may also change a button artwork to indicate the change to the "on" state. In another embodiment, client 138 may maintain the state of the button by setting the value of a corresponding flag. Additionally, client 138 may translate the user's touch input into a mouse button down command and transmit the command to host machine 110, where virtual mouse driver 114 may handle the command by injecting the user's input into guest VM 112 using a device driver of the guest OS. The guest OS may itself respond to the injected input and/or transmit a mouse button down event to an application running thereon.

Conversely, if the mouse left-click button 308 (or mouse right-click button 310) is currently in the "on" state, a user's touch on the button may not trigger any mouse events, while the release of the user's finger on the button may trigger a mouse button up event and change the current state of the button to the "off" state. In one embodiment, the user's release of the button may also change a button artwork to indicate the change to the "off" state. In another embodiment, client 138 may translate the user input to a mouse button up command and transmit the command to host machine 110, where virtual mouse driver 114 may handle the command by inject the user's input into guest VM 112. The guest OS may itself respond to the injected input and/or transmit a mouse button up event to an application running thereon.

Panel B shows the result of the user's tap on switch button 312. As discussed, establishing tap on switch button 312 when left-click button 308 and right-click button 310 are in "click" mode causes client 138 to change the mode of left-click button 308 and right-click button 310 to "on/off" mode. Illustratively, switch button 312', which is displayed after the user's tap, is of different shading than switch button 312, which was displayed before the user's tap, so as to distinguish "on/off" mode from "click" mode. In an alternative embodiment, the artwork of buttons 308 and 310 may be changed to indicate the mode. Of course, artwork other than buttons having different shading may also be used to distinguish between the modes.

Panel B also shows the user touching left-click button 308 as the button is in "on/off" mode. As discussed, client 138 may change a state of left-click button 308 from an "off" state to an "on" state in response to the user's release of left-click button 308 if the button is currently in the "off" state, and vice versa in response to the user's release of left-click button 308 if the button is currently in the "on" state. As shown, client 138 further changes an artwork displayed for left-click button 308 to a shaded left-click button 308, as depicted in panel C, to indicate the "on" state of the button. This artwork may be changed when the user touches the button to indicate the change to the "on" state. Of course, artwork other than shaded and unshaded buttons may be used to indicate the state of the button in other embodiments.

Panel C further depicts the user dragging his or her finger downwards and to the right within the boundaries of touch area 306 while maintaining contact with multi-touch display surface 132. In response, client 138 may continually calculate position coordinates and transmit commands, referred to herein as move commands, based on the current location of the user's finger to host machine 110. Similar to commands for mouse clicks, move commands based on the location of the press-and-hold may be handled by virtual mouse driver 114, which may inject the user's input into guest VM 112, where guest OS may itself act in response to the user input and/or transmit move events to an application, which acts in response to the input. Client 138 may then receive an updated UI interface 301 from guest OS that reflects a change in the appearance of the guest OS and/or the application in response to the mouse event, and instruct a display driver to display the updated UI 301. For example, the updated UI 301 of panel C depicts the result of a drag operation, namely the movement of mouse 314 along with icon $303_1$ in the direction that the user's finger moves.

The drag operation shown in panel C may be ended by another tap on left-click button 308. As the button is currently in the "on" state, the user's touch of left-click button 308 during the tap may not trigger any events, while the user's release of the left-click button 308 during the tap may trigger a change in the state to "off"; a change in artwork to indicate the "off" state; and a mouse up event which ends the drag operation, as the mouse button up event is commonly used to terminate a drag or highlighting operation.

Figure 4:
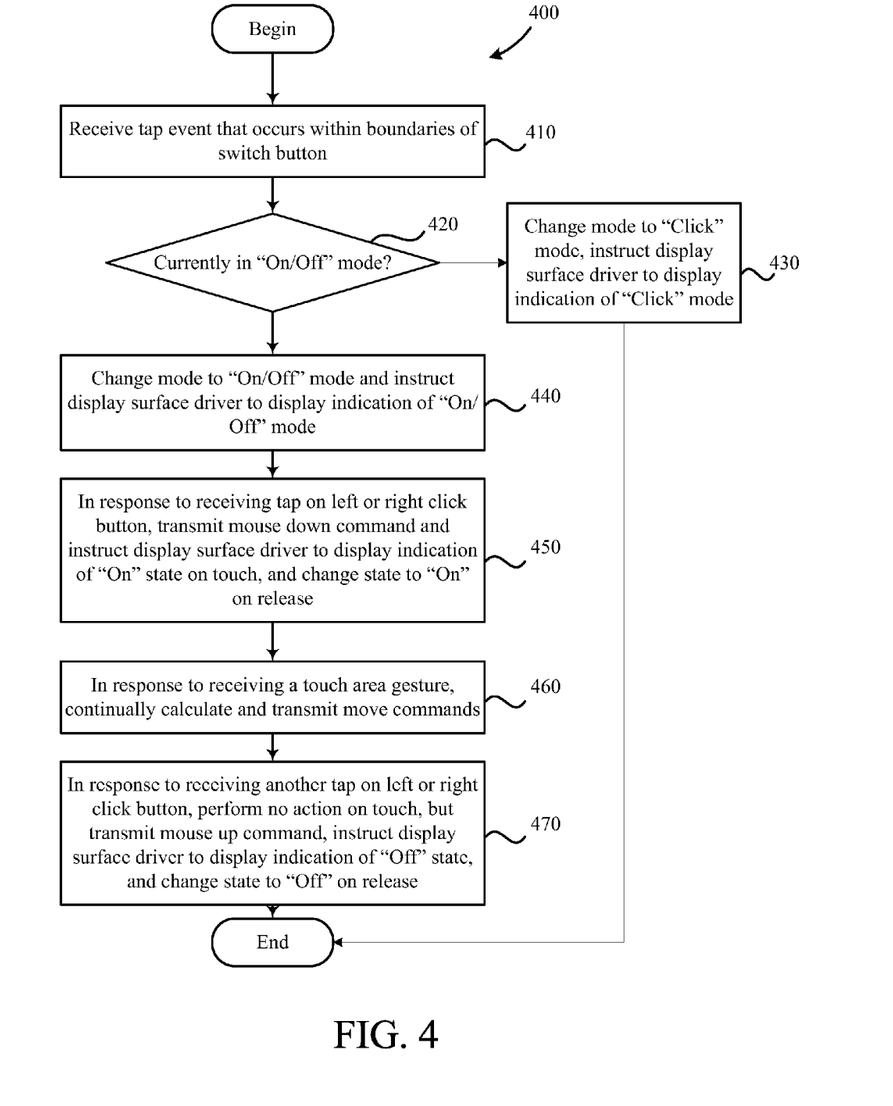
FIG. 4 is a flow diagram of method steps for performing a drag operation using a virtual touch pad having two-mode buttons, according to an embodiment of the invention.

FIG. 4 is a flow diagram of method steps for performing a drag operation using a virtual touch pad having two-mode buttons, according to an embodiment. As shown, the method 400 begins at step 410, where client 138 receives a tap event which the client 138 determines to be within the boundaries of switch button 312. At step 420, client 138 determines whether the current mode is "click" mode or "on/off" mode. As discussed, client 138 may maintain a mode of left-click button 308 and right click button 310 by, e.g., setting the value of a corresponding flag.

If client 138 determines that the current mode is "on/off" mode, then at step 430, client 138 changes the mode to "click" mode and issues instructions to multi-touch display surface driver 134 to display an indication of the "click" mode status. Doing so exits out of "on/off" mode such that taps on left-click button 308 and right-click button 310 are translated to commands corresponding to traditional click events, each of which includes both a mouse button down event and a mouse button up event (e.g. pressing down the button may trigger the mouse button down event, while releasing the mouse button may trigger the mouse button up event). Note, in "click" mode, drag operations may be performed normally, namely by press-and-hold of left-click button 305 in conjunction with dragging a finger across touch area 306.

If client 138 determines that the current mode is "click" mode, then at step 440, client 138 changes the mode to "on/off" mode and issues instructions to multi-touch display surface driver 134 to display an indication of the "on/off" mode status. Doing so enters "on/off" mode such that taps on left-click button 308 and right-click button 310 are translated to commands corresponding to either mouse button up or mouse button down events. As discussed, such commands are transmitted to host machine 110, where virtual mouse driver 114 may handle the commands by injecting the user's input into guest VM 112 using a device driver of the guest OS. In response to the input, guest OS may itself act and/or transmit a mouse button down event (or mouse button up event) to an application running thereon.

At step 450, in response to receiving a tap on left-click button 308, client 138 transmits a mouse down command and instructs display surface driver 134 to display an indication of the "on" state on the user's touch of left-click button 308, and changes the state to "on" on the user's release of the left click button 308. That is, the user's touch on the button triggers the mouse-down event and a change of artwork to indicate a transition to the "on" state. Then, no event is triggered by the user's release of the button, but the state of the button is changed to "on." Note, the default state of left-click button 308 (and right-click button 310) may be the "off" state, and the "off" state may be changed to an "on" state upon the release of the button, as discussed.

In one embodiment, client 138 may also disable "tap to click" (e.g., via the virtual mouse driver 114) on touch area 306 in response to receiving the touch on left-click button 308 if the state prior to the touch was "off." Doing so prevents "tap to click" from breaking the drag or highlighting operation, because a mouse button up command, which would otherwise be generated in response to the user's tap at step 450, may terminate the drag or highlighting operation. Note, client 138 may later re-enable or otherwise permit "tap to click" after receiving a release of a finger from left-click button 308 while the button was previously in the "on" state, which, as discussed, changes the state of the button to "off."

At step 460, client 138 continually transmits mouse move commands based on a current location of contact between the user's finger and multi-touch display surface 132 as the user drags a finger across touch area 306. As discussed, such commands may be handled by virtual mouse driver 114, which injects the user's input into guest VM 112, where guest OS may itself act and/or transmit mouse move events to an application. In turn, the guest OS may transmit an updated UI interface 301 to client 138 that reflects a change in the displayed appearance of the guest OS and/or the application in response to the mouse event, and instruct a display driver to display the updated UI 301. For example, displayed elements of the guest OS and/or the application may be dragged from one UI 301 location to another in response to the mouse move commands. As another example, displayed text may be highlighted in response to the mouse move commands.

At step 470, in response to a release during another tap on left-click button, client 138 transmits a mouse button up command, changes a state of left-click button 308 to "off," and changes button artwork to indicate the "off" state. That is, no event is triggered on the user's touch of the button during the tap, but the mouse button up command, as well as a change in the state to "off" and corresponding artwork to show the "off" state, are triggered upon the user's release of the button. The mouse button up command is commonly used to terminate a drag or highlighting operation. In one embodiment, guest OS and/or an application running thereon may be configured to end the drag or highlighting operation in response to such a command, or a mouse button event generated in response thereto.

Advantageously, embodiments described herein permit drag operations to be performed using a virtual touchpad without requiring a timer, which may be unreliable due to delay in remote sessions. Further, by turning off "tap-to-click" when drag and highlighting operations are being performed, and vice versa, the operations are not broken by unintentional clicks.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for performing an operation on a virtual touchpad, comprising:
    detecting a tap of a switch button that is separate from mouse buttons and that is displayed within the virtual touchpad;
    responsive to detecting the tap of the switch button, changing a mode of a mouse button of the mouse buttons of the virtual touchpad from a click mode to an on/off mode, wherein the mouse button is distinct from a touch area of the virtual touchpad, wherein, in the click mode, tapping on the mouse button triggers both a mouse button down event upon touch and a mouse button up event upon release, and wherein, in the on/off mode, tapping on the mouse button triggers the mouse button down event upon touch but not the mouse button up event when the mouse button is in an off state and triggers the mouse button up event upon release but not the mouse button down event when the mouse button is in an on state, wherein changing the mode of the mouse button further comprises:
        maintaining the mode of the mouse button of the mouse buttons of the virtual touchpad by setting a value of a flag; and
        changing the value of the flag by tapping the switch button;
    upon receiving a first tap on a displayed representation of the mouse button when the mouse button is in the off state, transmitting a mouse button down command to an operating system in response to a touch during the first tap, and changing the state of the mouse button to the on state in response to a release during the first tap;
    in response to receiving a drag on a displayed representation of the touch area of the virtual touchpad, transmitting move commands to the operating system;
    upon receiving a second tap on the displayed representation of the mouse button, transmitting a mouse button up command to the operating system and changing the state of the mouse button to the off state in response to a release during the second tap; and
    in further response to determining that the state of the mouse button is in the off state prior to receiving the touch during the first tap and in response to receiving the touch during the first tap, a tap-to-click functionality of the virtual touchpad is disabled, and wherein, in further response to receiving the release during the second tap, the tap-to-click functionality of the virtual touchpad is re-enabled.

2. The method of claim 1, wherein a user interface (UI) displays indications of the mode and the state of the mouse button.

3. The method of claim 1, wherein the operating system is running in a virtual machine executing on a remote host machine.

4. The method of claim 1, wherein the drag on the displayed representation of the touch area highlights a segment of text in a UI.

5. The method of claim 1, wherein the touch area is a mouse navigation portion, and wherein the mouse button is one of a left-click button and a right click button.

6. The method of claim 1, wherein the tap of the switch button has a duration less than one second.

7. A non-transitory computer-readable storage medium embodying computer program instructions for performing an operation on a virtual touchpad, the computer program instructions implementing operations, the operations comprising:
    detecting a tap of a switch button that is separate from mouse buttons and that is displayed within the virtual touchpad;
    responsive to detecting the tap of the switch button, changing a mode of a mouse button of the mouse buttons of the virtual touchpad from a click mode to an on/off mode, wherein the mouse button is distinct from a touch area of the virtual touchpad, wherein, in the click mode, tapping on the mouse button triggers both a mouse button down event upon touch and a mouse button up event upon release, and wherein, in the on/off mode, tapping on the mouse button triggers the mouse button down event upon touch but not the mouse button up event when the mouse button is in an off state and triggers the mouse button up event upon release but not the mouse button down event when the mouse button is in an on state, wherein changing the mode of the mouse button further comprises:
        maintaining the mode of the mouse button of the mouse buttons of the virtual touchpad by setting a value of a flag; and
    changing the value of the flag by tapping the switch button;
    upon receiving a first tap on a displayed representation of the mouse button when the mouse button is in the off state, transmitting a mouse button down command to an operating system in response to a touch during the first tap, and changing the state of the mouse button to the on state in response to a release during the first tap;
    in response to receiving a drag on a displayed representation of the touch area of the virtual touchpad, transmitting move commands to the operating system;
    upon receiving a second tap on the displayed representation of the mouse button, transmitting a mouse button up command to the operating system and changing the state of the mouse button to the off state in response to a release during the second tap; and
    in further response to determining that the state of the mouse button is in the off state prior to receiving the touch during the first tap and in response to receiving the touch during the first tap, a tap-to-click functionality of the virtual touchpad is disabled, and wherein, in further response to receiving the release during the second tap, the tap-to-click functionality of the virtual touchpad is re-enabled.

8. The computer-readable storage medium of claim 7, wherein a user interface (UI) displays indications of the mode and the state of the mouse button to a user.

9. The computer-readable storage medium of claim 7, wherein the operating system is running in a virtual machine executing on a remote host machine.

10. The computer-readable storage medium of claim 7, wherein the drag on the displayed representation of the touch area highlights a segment of text in a UI.

11. The computer-readable storage medium of claim 7, wherein the touch area is a mouse navigation portion, and wherein the mouse button is one of a left-click button and a right click button.

12. A system, comprising:
a processor; and
a memory, wherein the memory includes a program for reducing perceived read latency, the program being configured to perform operations for performing an operation on a virtual touchpad, comprising:
detecting a tap of a switch button that is separate from mouse buttons and that is displayed within the virtual touchpad;
responsive to detecting the tap of the switch button, changing a mode of a mouse button of the mouse buttons of the virtual touchpad from a click mode to an on/off mode, wherein the mouse button is distinct from a touch area of the virtual touchpad, wherein, in the click mode, tapping on the mouse button triggers both a mouse button down event upon touch and a mouse button up event upon release, and wherein, in the on/off mode, tapping on the mouse button triggers the mouse button down event upon touch but not the mouse button up event when the mouse button is in an off state and triggers the mouse button up event upon release but not the mouse button down event when the mouse button is in an on state, wherein changing the mode of the mouse button further comprises:
maintaining the mode of the mouse button of the mouse buttons of the virtual touchpad by setting a value of a flag; and
changing the value of the flag by tapping the switch button;
upon receiving a first tap on a displayed representation of the mouse button when the mouse button is in the off state, transmitting a mouse button down command to an operating system in response to a touch during the first tap, and changing the state of the mouse button to the on state in response to a release during the first tap,
in response to receiving a drag on a displayed representation of the touch area of the virtual touchpad, transmitting move commands to the operating system, and
upon receiving a second tap on the displayed representation of the mouse button, transmitting a mouse button up command to the operating system and changing the state of the mouse button to the off state in response to a release during the second tap; and
in further response to determining that the state of the mouse button is in the off state prior to receiving the touch during the first tap and in response to receiving the touch during the first tap, a tap-to-click functionality of the virtual touchpad is disabled, and wherein, in further response to receiving the release during the second tap, the tap-to-click functionality of the virtual touchpad is re-enabled.

13. The system of claim 12, wherein a user interface (UI) displays indications of the mode and the state of the mouse button.

14. The system of claim 12, wherein the operating system is running in a virtual machine executing on a remote host machine.

15. The system of claim 12, wherein the touch area is a mouse navigation portion, and wherein the mouse button is one of a left-click button and a right click button.

* * * * *